(12) United States Patent
Jetter et al.

(10) Patent No.: US 7,811,103 B2
(45) Date of Patent: Oct. 12, 2010

(54) INTERRUPTER FOR AN ELECTRICAL WIRE

(75) Inventors: Rolf Jetter, Darmstadt (DE); Andreas Wilkner, Griesheim (DE); Torsten Sieler, Seeheim-Jugendheim (DE)

(73) Assignee: Tyco Electronics AMP GmbH, Bensheim (DE)

( * ) Notice: Subject to any disclaimer, the term of this patent is extended or adjusted under 35 U.S.C. 154(b) by 0 days.

(21) Appl. No.: 12/331,958

(22) Filed: Dec. 10, 2008

(65) Prior Publication Data

US 2009/0156032 A1 Jun. 18, 2009

(30) Foreign Application Priority Data

Dec. 12, 2007 (DE) ....................... 10 2007 059 932

(51) Int. Cl.
*H01R 13/62* (2006.01)
(52) U.S. Cl. ........................................ 439/152; 439/180
(58) Field of Classification Search .................. 439/418, 439/180
See application file for complete search history.

(56) References Cited

U.S. PATENT DOCUMENTS 2,977,156 A * 3/1961 Di Gioia John ................ 303/2
5,435,754 A * 7/1995 Hotea et al. ............. 439/620.21
2001/0036761 A1* 11/2001 Schulz et al. ................ 439/180
2002/0100166 A1* 8/2002 Sullivan et al. ................ 29/857
2007/0066108 A1* 3/2007 Razafiarivelo et al. ...... 439/180

FOREIGN PATENT DOCUMENTS

| DE | 8219401 U1 | 10/1982 |
| DE | 19606447 A1 | 8/1997 |
| DE | 10008577 A1 | 11/2000 |
| DE | 19832573 C2 | 11/2000 |
| DE | 10129781 A1 | 1/2003 |
| DE | 69913400 T2 | 10/2004 |
| DE | 102004012304 A1 | 10/2005 |

* cited by examiner

*Primary Examiner*—Tho D Ta
*Assistant Examiner*—Travis Chambers
(74) *Attorney, Agent, or Firm*—Barley Snyder LLC

(57) ABSTRACT

The invention relates to an interrupter for an electrical wire 9, having a first terminal and a second terminal insulated electrically from the first terminal and also a contact 3, which takes the form of a separate component from the terminals and is provided to produce a conductive connection between the first and second terminals, the contact 3 being capable of being brought by a linear movement from a first position connecting the terminals into a second position in which the terminals are disconnected, an actuator being provided to move the contact and a lever 5 being provided, which acts on the contact 3 by means of a joint 14, 16, 17 and is provided to transmit force from the actuator to the contact 3.

11 Claims, 5 Drawing Sheets

INTERRUPTER FOR AN ELECTRICAL WIRE

CROSS-REFERENCE TO RELATED APPLICATIONS

This application claims the benefit of the filing date under 35 U.S.C. §119(a)-(d) of German Patent Application No. 10 2007 659 932.5, filed Dec. 12, 2007.

FIELD OF THE INVENTION

The invention relates to an electrical connector and more particularly to an interrupter for an electrical wire.

BACKGROUND

Interrupters are used for example as safety battery clamps in vehicles, which in the event of an accident disconnect one or more of the motor vehicle's electrical loads from the power supply to prevent electrical sparking.

DE 196 06 447 A1 for example discloses a circuit-breaker for a vehicle battery wire, in which a contact between two connecting parts ensures the electrical connection thereof. The retention force of the connecting element is applied substantially at a location which is spatially distant from the contact. Furthermore, an auxiliary drive is provided, which moves away the connecting element to disconnect the electric circuit.

DE 10 2004 012 304 A1 discloses a circuit-breaker for a vehicle battery wire, having a first terminal which is connected permanently to a post of the battery and a second terminal insulated electrically from the first terminal, and also a contact producing a current path between the first and second terminals in a contact position. The two terminals here take the form of hollow cylinders, the contact sliding inside these cylinders. The contact may be driven out of the cylinders by a pyrotechnic element. In this way, the second terminal is disconnected from the first terminal.

Problems exist with such interrupters for an electrical wire of the above-mentioned type in that they require a relatively large installation space and are sensitive to soiling or debris presented during operation.

SUMMARY

The invention provides an interrupter for an electrical wire, having a first terminal and a second terminal insulated electrically from the first terminal and also a contact, which takes the form of a separate component from the terminals and is provided to produce a conductive connection between the first and second terminals. The contact is capable of being brought, by a linear movement, from a first position connecting the terminals into a second position in which the terminals are disconnected. An actuator is provided to move the contact. A lever is provided, which acts on the contact by means of a joint and is provided to transmit force from the actuator to the contact.

BRIEF DESCRIPTION OF THE DRAWINGS

The invention will be explained in greater detail below with reference to Figures and exemplary embodiments, without the general concept of the invention being limited.

DETAILED DESCRIPTION OF THE EMBODIMENTS

Figure 1A:
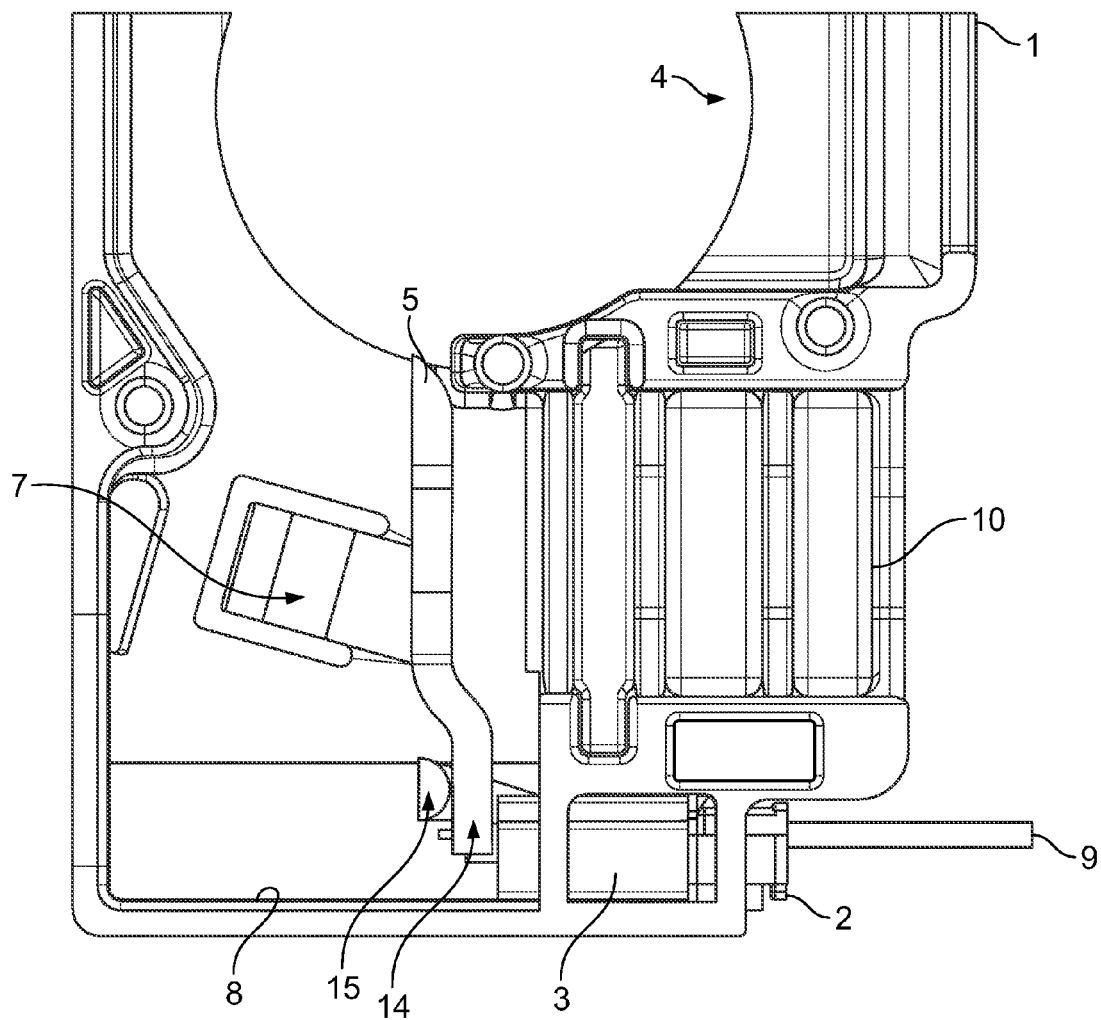
FIGS. 1A and 1B show, in plan and perspective views, an interrupter according to the invention for an electrical wire in a first position in which the terminals are connected.
Figure 1B:
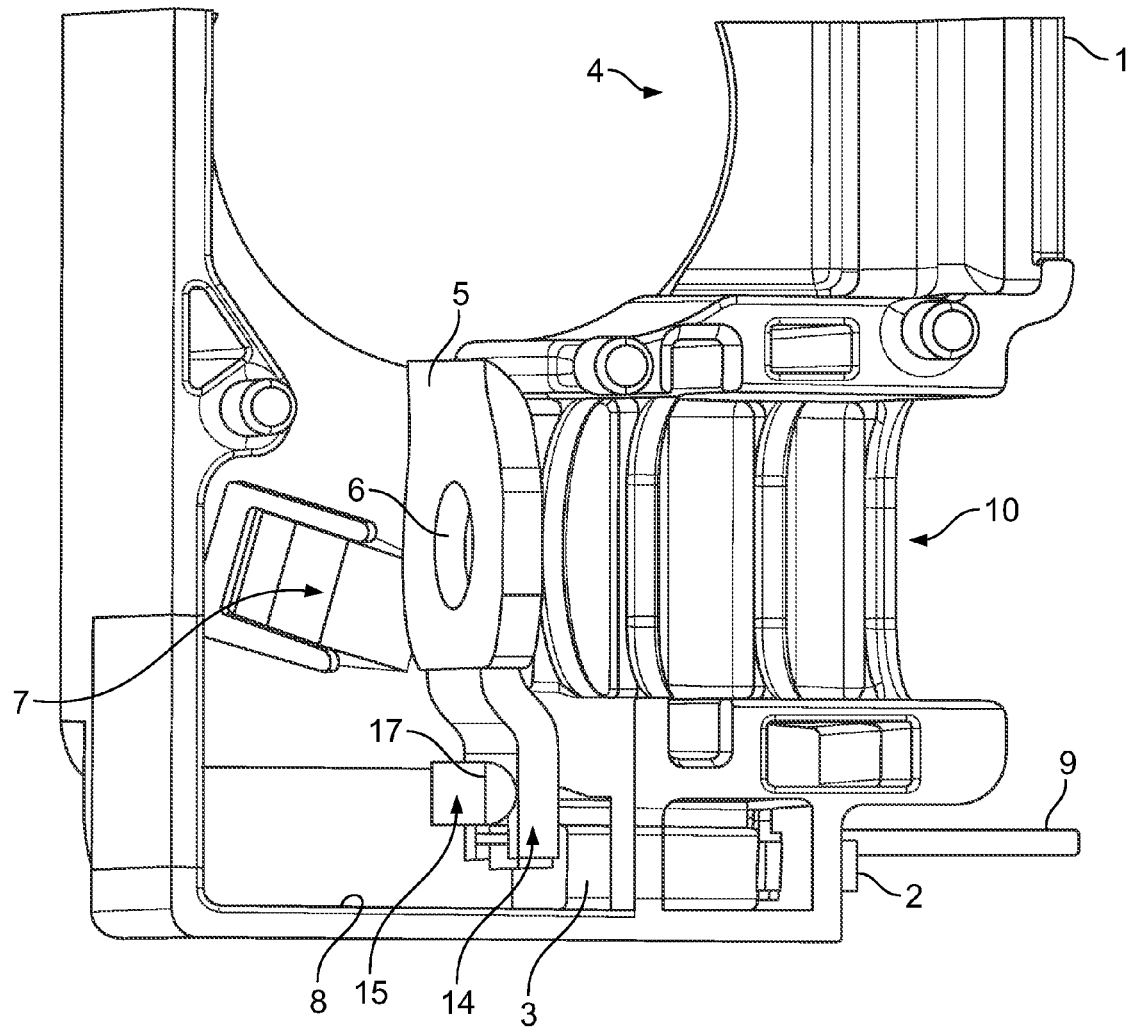

FIG. 1a shows a housing 1 of a battery clamp, which is equipped with an interrupter according to the invention. In the illustration, the cover has been removed from the housing 1 of the safety battery clamp, so as to open up the view into the inside. FIG. 1b shows the same structural elements in a perspective representation. In the housing 1 the battery clamp has a recess 4. This recess is provided to receive a battery post. To this end, the battery clamp additionally comprises a contact and clamping device, not shown in the figures. The recess 4 is not shown in full in the figure.

Figure 3:
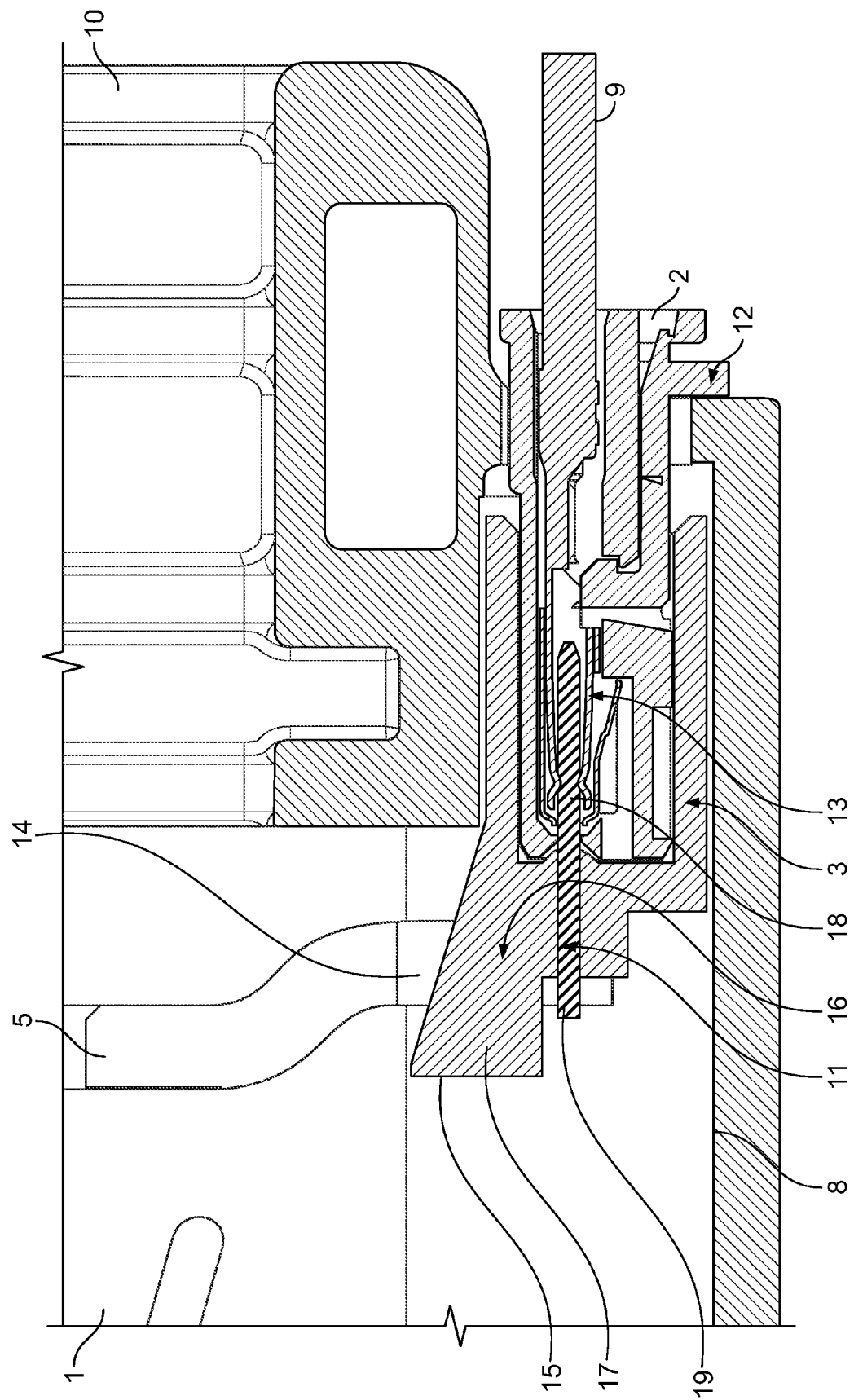
FIG. 3 shows a detail of the contact and of the terminals in a first position in which the terminals are connected.

At the lower edge of the housing there is located a first and a second terminal, these being located in a separate, smaller housing 2. The smaller housing 2 is located in a corresponding recess in the housing 1. Electrical terminal wires 9 to the terminals in the housing 2. When the interrupter device is in operation, the first and second terminals in the housing 2 are connected together by a contact 11. The contact 11 is located in the pin header 3. A section through the housing 2 and the pin header 3 is shown in FIG. 3 and is explained below.

To move the contact 11 with pin header 3 away from the housing 2, a lever 5 is fastened to the pin header 3. Fastening of the lever 5 is effected by a peg 15, which is fastened to the pin header 3 at the opposite end from the opening. The peg 15 has a cross-section which varies along its length. Thus, the peg has at least a first portion 16 with a smaller cross-section and a second portion 17 with a larger cross-section. At its end, the lever 5 comprises a slot open at the bottom, such that a fork 14 is formed. This fork 14 is pushed over the first portion 16 of the peg 15. The second portion 17 of the peg 15 prevents the fork 14 of the lever 5 from sliding off the peg 15.

Furthermore, the housing 1 comprises an opening 10, which is provided to accommodate a pyrotechnic actuator. The actuator consists of a cylinder, in which a piston is movably mounted. As a result of the evolution of gas during burn-up of the pyrotechnic charge, the piston is driven out of the cylinder in the direction of lever 5. The pyrotechnic actuator is not shown in the figures. To receive the piston of the pyrotechnic actuator, an opening 6 is located in the lever 5. Through displacement of the lever 5 by the actuator, the pin header 3 slides rearwards over the sliding surface 8 and so disconnects the contact 11 attached to the pin header 3 from the terminal 13.

To prevent the pin header 3 from sliding back into the initial position and causing unintentional contact closure of the supply wires 9, a catch 7 is located in the housing 1. The catch 7 consists of a part of the housing 1. The housing part is detached by three elongate slots and shaped such that it protrudes inwards. Due to the resilience of the material of the catch 7, the latter may be pushed outwards by lever 5 as it slides thereover when forced rearwards by the actuator. When the lever 5 has reached its final position, the catch 7 springs back inwards into the housing and thus forms a stop for the lever 5, so reliably preventing it from sliding back.

Figure 2A:
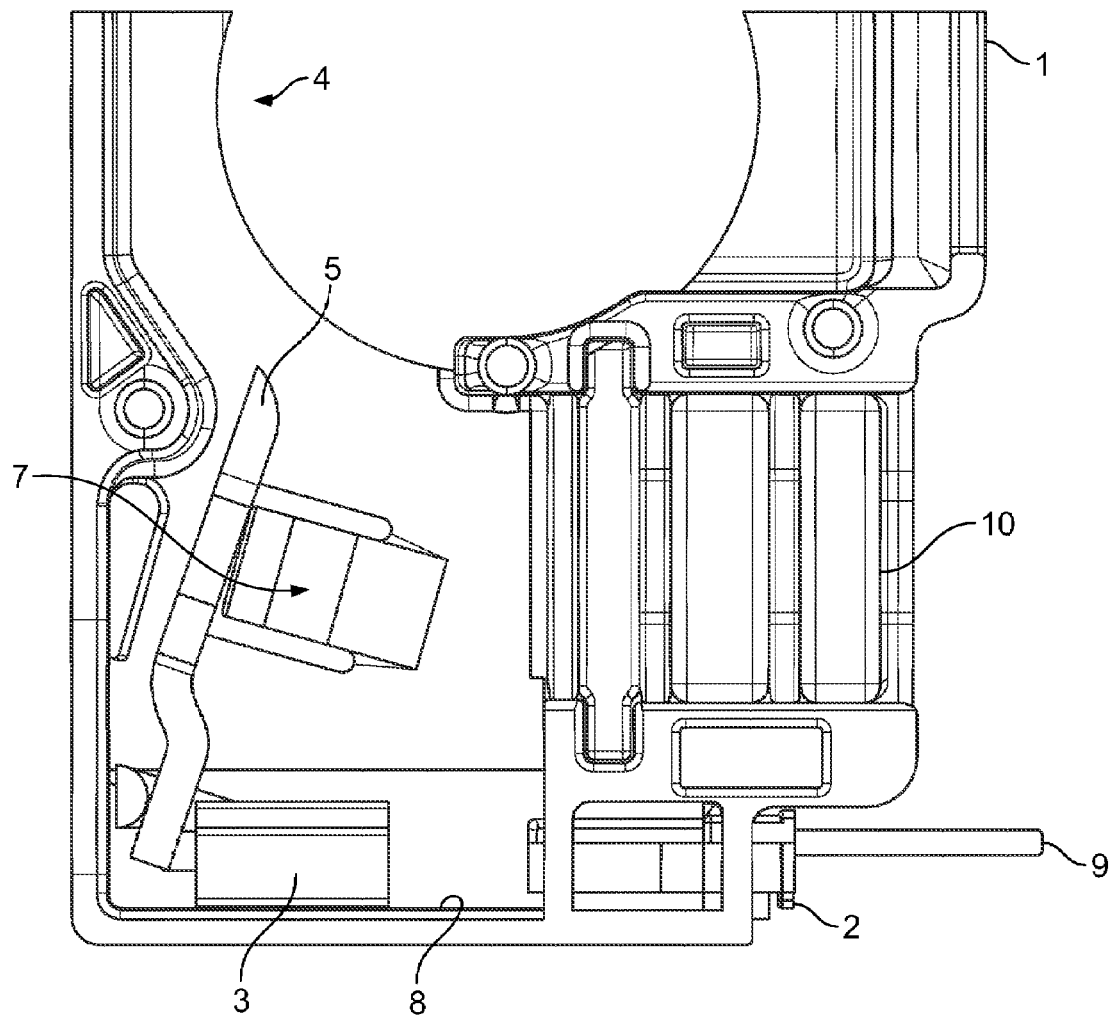
FIGS. 2A and 2B show, in plan and perspective views, the interrupter according to FIGS. 1A and 1B in a second position in which the terminals are disconnected.
Figure 2B:
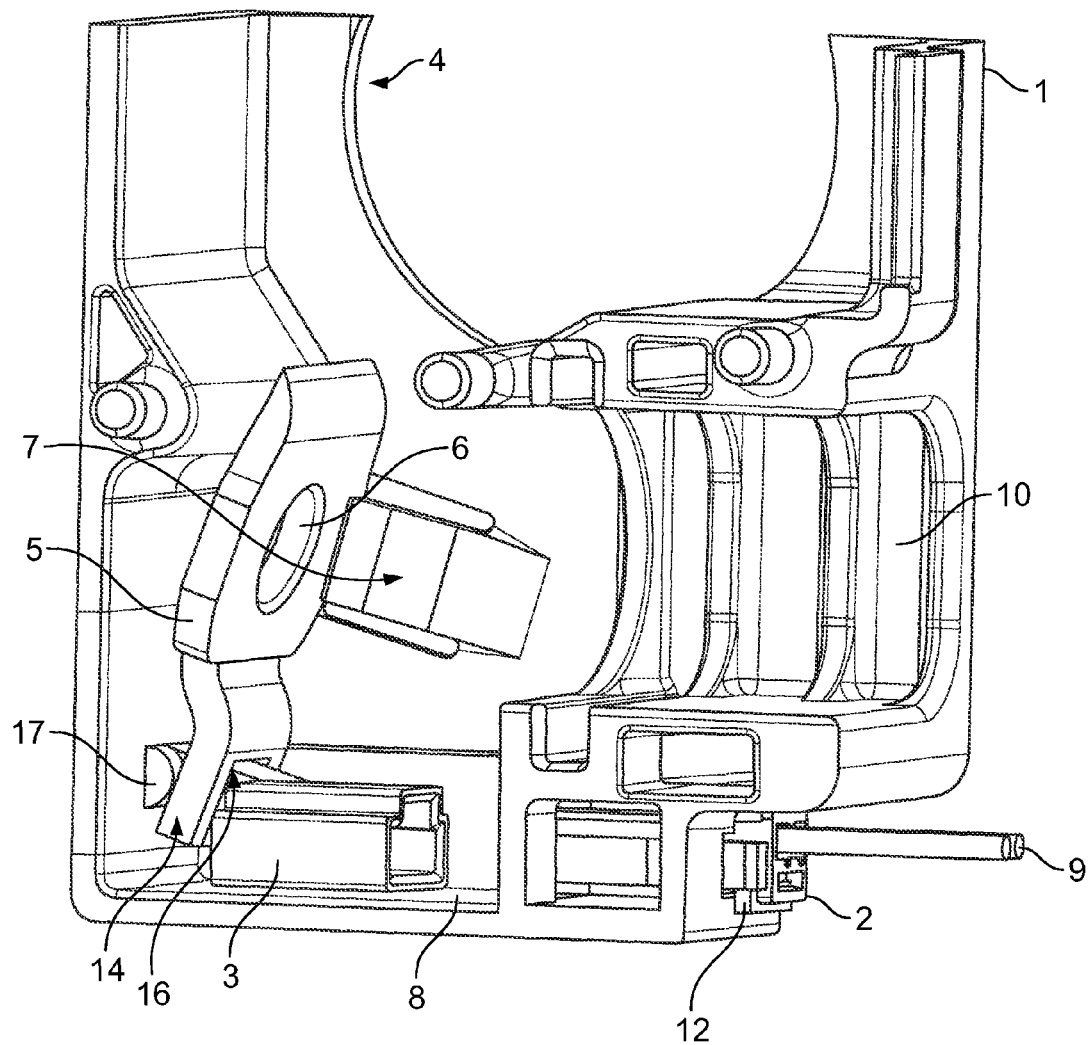

FIG. 2 shows the interrupter in the triggered position. Here FIG. 2a is a representation in which the cover has been removed from the housing 1 of the safety battery clamp so as to open up the view into the inside. FIG. 2b is a perspective representation.

FIG. 2 shows how the lever 5 comes to lie behind the catch 7 after the catch 7 has been forced into the rear housing part by the pyrotechnic actuator in recess 10. The rearward movement of the lever 5 at the same time brings about a linear sliding movement of the pin header 3 over the sliding surface 8. Since the terminals in the housing 2 are held in position by the projection 12, which rests against the housing 1, the housing 2 cannot follow the movement of the pin header 3. This results in disconnection of the contacts 11 from the terminals 13. In this way, the current flow between the two wires 9 is interrupted.

FIG. 3 shows a section through the pin header 3 and the housing 2 of the terminals 13. Housing 2 serves to position the terminals 13 so as to ensure reliable engagement of the contact 11. The contact 11 consists of two pin contacts 18, which are connected via a shorting jumper 19. For positioning purposes, the pin contacts 18 are press-fitted into the material of the pin header 3. In the mated state, pin header 3 and housing 2 form a splash-proof unit, which makes it more difficult for dirt and moisture to penetrate to the contacts 13 and 18. Sometimes when requirements are more stringent, the pin header 3 and housing 2 may also be provided with a seal, to provide a water-tight structure.

The peg 15 is of one piece construction with the pin header 3. This may be achieved, for example, during production of the pin header 3 by injection molding by an appropriately designed injection mold. The peg 15 comprises a first area 16 with a smaller cross-section, on which the fork 14 of the lever 5 engages. Behind the fork 14 is located a portion 17 with larger cross-section, which prevents the lever 5 from sliding off the peg 15. The portion 17 thus introduces the force required to disconnect the contact 11 into the pin header 3.

The housing 2 serves to position the contacts 13, so as to allow reliable engagement of the pins 18 in the contact 13. Furthermore, housing 2 serves to insulate the two terminals 13. In order to prevent the housing 2 from being pulled rearwards together with pin header 3 over the sliding surface 8, the housing 2 comprises a projection 12, which rests against the housing 1.

The reliability of the interrupter according to the invention may be further increased by connecting housing 2 and housing 1 together by force-fit in all spatial directions. Such a force-fit connection may be achieved for example by latching, welding or adhesive bonding of the housings 2 and 1.

Advantageously, according to the invention, the structural size and the reliability of an interrupter for an electrical wire may be reduced in that the contact connecting the two terminals is connected to the actuator by means of a lever. In this way, the contact may be of smaller and more compact construction, since it no longer has to have a minimum size predetermined by the size of the actuator.

The contact may be disconnected from the terminal on a straight path by a joint between the lever and the contact. This straight movement makes it possible to bring the terminals and the contact into contact with one another over a contact surface extending in the direction of movement without them jamming upon disconnection of the connection. In this way, the contact surface between the terminals and the contact is enlarged, such that contacting is reliable and also suitable for higher currents.

As described, the joint is advantageously formed between the lever and the contact in that the contact comprises an elongate guide member with a first portion with a first cross-section and a second portion with a second cross-section, the first cross-section having a smaller area than the second cross-section and a fork being formed on the lever, which fork grips round the first portion of the guide member. This configuration of the joint may be produced in a particularly simple manner, since the elongate guide member may be formed in the same operation as production of the contact, for example in the injection moulding process. The fork-shaped end of the lever may be pushed onto the guide member without any need during final assembly of a further production step providing a connection, for example a screw connection. The lever and the contact with the guide member fitted thereon are fixed by the surrounding housing parts in such a way that the lever is prevented from sliding off in the direction of the fork opening.

Particularly simple final fitting of the interrupter according to the invention in a housing, for example the housing of a battery clamp, is achieved in that a pin header or a socket housing is used as the terminal. Such a two-pole socket housing or a pin header with two pin contacts inserted by form and/or force-fit may encompass both the first and second terminals. The form and/or force-fit connection may be achieved for example by casting, press-fitting or latching the contacts into the pin header or the socket housing. Such a housing may be fixed in the housing of a battery clamp by means of a catch, adhesive bond or weld. This fixing applies the necessary counter-force when the contact is disconnected from the terminals by force generated by the actuator.

If a pin header or a socket housing is provided as the terminal, the contact comprises the mating component, i.e. a socket housing or a pin header. The two electrical contacts of the contact are short-circuited by means of a conductive connection. Thus, when the two multi-pole connectors are connected, the current flows from the first contact of the connector, which forms the first terminal, to the first contact of the contact, thence via the shorting jumper to the second contact of the contact and thence to the second contact of the terminal and to the consumer. By disconnecting the two multi-pole connectors, the shorting jumper between the first and second terminals may be removed, such that current flow is interrupted. The pin header and the socket housing may preferably be designed such that, in the plugged-together state, they prevent the penetration of dirt and moisture. In this way, reliability is ensured even in the case of use for many years without servicing.

To allow reliable disconnection of the contact and prevent jamming, the force of the actuator is transmitted via an articulately mounted lever. The reliability of the disconnection process may be further increased if the contact is guided on a straight path by means of a mechanical guide. In this case, jamming is also avoided when the contact is no longer completely engaged with the terminals and thus no longer guided thereby.

A guide member may for example be formed by a groove in a component and a tongue on a further component. For example, the contact comprises an elongate projection, which forms the tongue, which is engaged with a groove. This groove may for example be provided in the housing into which the interrupter according to the invention has been inserted. It goes without saying that a person skilled in the art will also consider providing the groove in a guide rail and thus producing a mechanical guide which is independent of the housing. The cross-section of the groove may be round or polygonal. A polygonal groove cross-section particularly preferably comprises undercut areas, in which a complementarily shaped tongue of the other component engages. Thus, lifting forces, which would lead to jamming of the contact in the terminal, may be absorbed by the mechanical guide. Sometimes a person skilled in the art will obviously also consider reversing the tongue and groove on the two components, so providing a groove on the contact and an elongate projection for guiding the contact on a further component.

To prevent undesired re-contacting after triggering of the interrupter, in one embodiment the interrupter according to the invention comprises a catch, with which the contact engages in its second position in which the terminals are disconnected. Such engagement may be brought about, for example, behind a resilient, inwardly protruding area of a housing surrounding the interrupter. The inwardly protruding area of the housing forms an inclined plane, over which slides the contact or a component connected therewith. The catch consisting of a resilient material gives under this movement. When the catch has been travelled over, it bends back into its initial position and places itself lockingly in front of the contact or a component connected mechanically therewith. In this way, the contact is reliably prevented from returning to its first position connecting the terminals, which would unintentionally re-establish current flow.

Advantageously, the catch acts on the lever, which also transmits the driving forces from the actuator. Thus, the catch as well as the actuator may be of larger size, even if the contact has only comparatively small geometric dimensions. Large catches and actuators display greater retaining and driving forces, which are more reliable in bringing about contact disconnection.

The actuator may take the form for example of springs, electromagnets or electric motors. The actuator preferably comprises a pyrotechnic element. Such a pyrotechnic element is highly reliable after a long period of non-use even without ongoing servicing. Furthermore, a pyrotechnic element allows triggering involving little complexity, for example by electrically generated activation energy. After triggering, within a very short period of time the pyrotechnic element makes available a large movement range and considerable force, which contributes to reliable disconnection of the contact from the terminals. A pyrotechnic actuator may consist for example of a cylinder with a piston mounted movably therein, the piston being driven out by gas pressure. The gas pressure is provided on triggering of the pyrotechnic element by the reaction products of an exothermically proceeding chemical reaction.

What is claimed is:

1. An interrupter for an electrical wire comprising:
a housing;
a smaller housing positioned in a recess in the housing;
a first terminal;
a second terminal being electrically insulated from the first terminal, the first and the second terminal positioned in the smaller housing;
a contact, provided to produce a conductive connection between the first and second terminals, the contact being movable by a linear movement from a first position connecting the terminals into a second position away from the smaller housing in which the terminals are disconnected;
an actuator provided to move the contact; and,
a lever which acts on the contact by a joint to transmit force from the actuator to the contact.

2. The interrupter according to claim 1, wherein the contact comprises an elongate guide member with a first portion with a first cross-section and a second portion with a second cross-section, the first cross-section having a smaller area than the second cross-section.

3. The interrupter according to claim 2, further comprising a fork being formed on the lever, the fork griping around the first portion of the guide member.

4. The interrupter according to claim 3, wherein contact comprises a pin header with two pin contacts arranged therein.

5. The interrupter according to claim 1, wherein the first and the second terminals are arranged in a socket housing.

6. The interrupter according to claim 5, wherein the socket housing is fixed in the housing of a battery clamp by a catch.

7. The interrupter according to claim 6 wherein the contact is guided on its straight path by a guide member.

8. The interrupter according to claim 6, wherein the guide member is formed by a groove in one component and a tongue on a further component.

9. The interrupter according to claim 8, wherein a catch is provided, in which the contact engages in the second position in which the terminals are disconnected.

10. The interrupter according to claim 9, wherein force is transmitted from the catch to the contact via the lever.

11. The interrupter according to claim 10, wherein the actuator comprises a pyrotechnic element.

* * * * *

UNITED STATES PATENT AND TRADEMARK OFFICE
CERTIFICATE OF CORRECTION

PATENT NO.         : 7,811,103 B2                                        Page 1 of 1
APPLICATION NO.    : 12/331958
DATED              : October 12, 2010
INVENTOR(S)        : Rolf Jetter et al.

It is certified that error appears in the above-identified patent and that said Letters Patent is hereby corrected as shown below:

In the Claims:
In Column 6, Line 21, Claim 3 "the fork griping around" should read --the fork gripping around--.

Signed and Sealed this
Twenty-second Day of February, 2011

David J. Kappos
*Director of the United States Patent and Trademark Office*